US006917893B2

(12) United States Patent
Dietsch et al.

(10) Patent No.: US 6,917,893 B2
(45) Date of Patent: Jul. 12, 2005

(54) SPATIAL DATA COLLECTION APPARATUS AND METHOD

(75) Inventors: Jeanne Dietsch, Peterborough, NH (US); William Kennedy, Peterborough, NH (US); Matthew LaFary, Peterborough, NH (US)

(73) Assignee: ActivMedia Robotics, LLC, Amherst, NH (US)

( * ) Notice: Subject to any disclaimer, the term of this patent is extended or adjusted under 35 U.S.C. 154(b) by 0 days.

(21) Appl. No.: 10/388,911

(22) Filed: Mar. 14, 2003

(65) Prior Publication Data

US 2003/0176986 A1 Sep. 18, 2003

Related U.S. Application Data

(60) Provisional application No. 60/364,902, filed on Mar. 14, 2002.

(51) Int. Cl.[7] .............................................. G01F 17/00
(52) U.S. Cl. ..................... 702/150; 702/152; 702/153
(58) Field of Search ................................. 702/150, 152, 702/153, 155

(56) References Cited

U.S. PATENT DOCUMENTS

| 5,091,869 | A | | 2/1992 | Ingram et al. |
| 5,675,514 | A | | 10/1997 | Lefebvre |
| 5,936,240 | A | | 8/1999 | Dudar et al. |
| 5,956,661 | A | | 9/1999 | Lefebvre et al. |
| 6,009,359 | A | * | 12/1999 | El-Hakim et al. ............ 701/28 |
| 6,314,341 | B1 | | 11/2001 | Kanayama |
| 6,352,504 | B1 | * | 3/2002 | Ise et al. ..................... 600/300 |

OTHER PUBLICATIONS

Sebastian Thrun, et al., "Learning Maps for Indoor Mobile Robot Navigation," School of Computer Science, (Apr. 14, 1996).

Sebastian Thrun et al., "A Probabilistic Approach to Concurrent Mapping and Localization for Mobile Robots," Machine Learning and Autonomous Robots, 31/5 ed., Kluwer Academic Publishers (Boston), (Mar. 14, 1998).
Sebastian Thrun et al., "A Probabilistic Online Mapping Algorithm for Teams of Mobile Robots,".
Sebastian Thrun et al., "Map Learning and High–Speed Navigation in RHINO," Carnegie Mellon University,.
Sebastian Thrun et al., "An Approach to Learning Mobile Robot Navigation," Robotics and Autonomous Systems, (Mar. 14, 1995).
Dieter Fox et al., "Active Markov Localization for Mobile Robots," (Mar. 19, 1998).
Jens–Steffen Gutmann et al., "Incremental Mapping of Large Cyclic Environments,".
Yufeng Liu et al., "Using EM to Learn 3D models of Indoor Environments with Mobile Robots," Eighteenth International Conference on Machine Learning, (Jun. 28, 2001).

* cited by examiner

*Primary Examiner*—Michael Nghiem
*Assistant Examiner*—Meagan S Walling
(74) *Attorney, Agent, or Firm*—Devine, Millimet & Branch; Paul C. Remus; Michelle Saquet Temple

(57) ABSTRACT

A spatial data collection apparatus collects and correlates spatial data for use in creating floor plans, maps and models of existing spaces. The apparatus includes a mobile platform with wheels to allow movement around a space. One or more positional sensors on the platform generate positional data related to a position of the platform. The positional data can include odometry data and optionally gyroscopic data for correcting the odometry data. One or more range-finding devices on the platform measure and calculate range data (e.g., 2-D or 3-D) relating to distances and angles between the platform and objects in the space. The apparatus collects, fuses and correlates the positional data and range data to produce spatial data and stores the spatial data for transfer to a PC for use in creating, viewing and/or editing a map of the space. The apparatus can also record media files (e.g., audio, video, or images) to be associated with locations within the map.

5 Claims, 6 Drawing Sheets

SPATIAL DATA COLLECTION APPARATUS AND METHOD

CROSS-REFERENCE TO RELATED APPLICATIONS

The present invention claims the benefit of co-pending U.S. Provisional Patent Application Ser. No. 60/364,902, filed on Mar. 14, 2002, which is fully incorporated herein by reference.

TECHNICAL FIELD

The present invention relates to an apparatus and method for collecting spatial data and more particularly, to an apparatus and method that collects and correlates spatial data for use in the creation of accurate floor plans, maps and models of existing spaces.

BACKGROUND INFORMATION

The creation of a floor plan, map, model or other such graphical representation of an existing space requires a representation of the spatial relationship between coordinate points of objects within the space, such as two walls of a room. The spatial relationship between coordinate points of objects has been traditionally measured by hand or with the help of tools that measure the distance between two points. These distances are then typically input into a computerized program that uses them to create the floor plan or may be used to draw the floor plan by hand. One example of a computer integrated floor plan system is disclosed in U.S. Pat. No. 5,091,862, which is fully incorporated herein by reference. Although the computer helps to produce accurate floor plans from the measured distances, using two people to obtain point by point measurements is often time-consuming.

Telemetric spatial recorders have been designed to allow operation by a single operator and thus facilitate the process of obtaining distance measurements for use in creating a floor plan. One type of conventional telemetric spatial recorder uses a base module and a remote module linked through an extendable cable. Examples of telemetric spatial recorders are disclosed in U.S. Pat. Nos. 5,675,514 and 5,956,661, which are fully incorporated herein by reference. Although the telemetric spatial recorders can obtain distance measurements with a single operator, these recorders are stationary when measuring distances and additional time is required to move the telemetric spatial recorder to a new location. When existing fixed measurement devices are moved to a new space, the drawing of the new space must typically be hand aligned with drawings of previous spaces. The existing methods measure wall to wall or room by room, without automatically orienting the relationships between various building parts or spaces.

Mobile robots have been used in modeling and characterizing hazardous spaces. Examples of such mobile robots are disclosed in greater detail in U.S. Pat. Nos. 5,936,240 and 6,314,341, which are fully incorporated herein by reference. These mobile robots are unnecessarily complex and expensive, however, for use in creating a floor plan or map of a non-hazardous location. Moreover, such mobile robots are difficult to drive and require significant practice to operate effectively.

Accordingly, there is a need for a spatial data collection apparatus capable of use by a single operator to quickly and easily collect spatial data from many locations within an existing space for use in creating a 2-D or 3-D graphical representation of the space. There is also a need for a spatial data collection apparatus capable of automating both the measurement of objects within a space and the orientation of the objects in relationship to each other.

SUMMARY

In accordance with one aspect of the present invention, a spatial data collection apparatus comprises a mobile platform and at least one wheel coupled to the mobile platform. One or more positional sensors are located on the mobile platform for generating positional data related to a position of the mobile platform. One or more range-finding devices are located on the mobile platform for measuring and calculating range data relating to distances and angles between the mobile platform and objects, such as walls and ceilings. A computational device collects and correlates the positional data and the range data to produce spatial data and stores the spatial data in a storage system.

According to another aspect of the present invention, a method is provided for collecting spatial data. The method comprises moving a spatial data collection apparatus around an area having objects. Positional data related to a position of the spatial data collection apparatus is generated and collected as the apparatus is moved. Range data related to distances and angles from the spatial data collection apparatus to the objects is measured and collected as the apparatus is moved. The positional data and the range data is correlated by interpolating locations of the spatial data collection apparatus when the range data was measured to produce spatial data including the range data together with the positional data representing the locations of the apparatus when the range data was measured. The spatial data is stored. The method can also include transferring the spatial data to an external computer, creating a graphical representation based on the spatial data, and editing the graphical representation.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
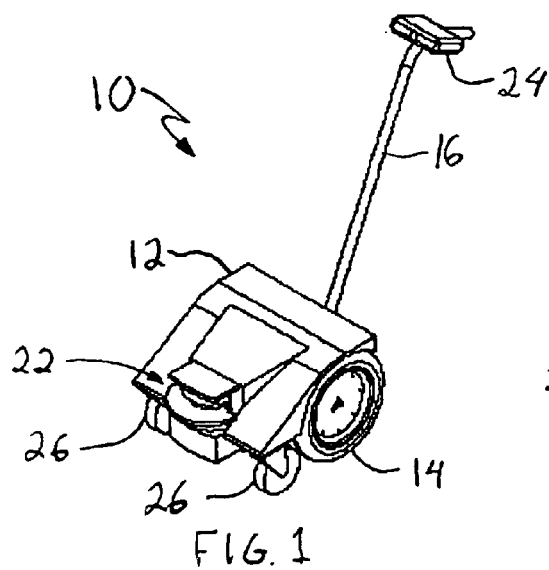
FIG. 1 is a perspective view of a spatial data collection apparatus, according to one embodiment of the present invention.
Figure 2:
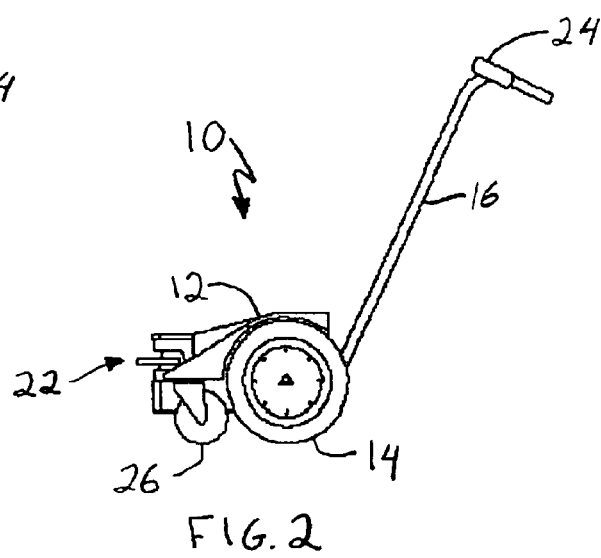
FIG. 2 is a side view of the spatial data collection apparatus shown in FIG. 1.
Figure 3:
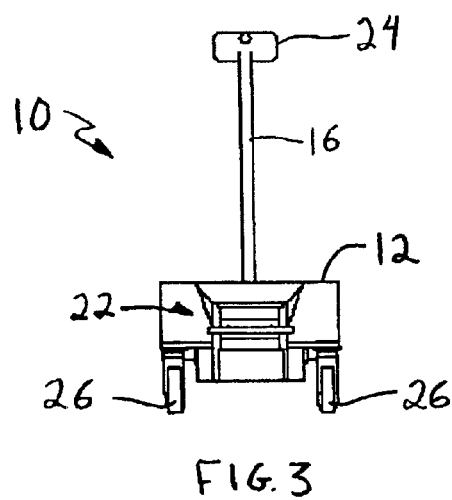
FIG. 3 is a front view of the spatial data collection apparatus shown in FIG. 1.
Figure 4:
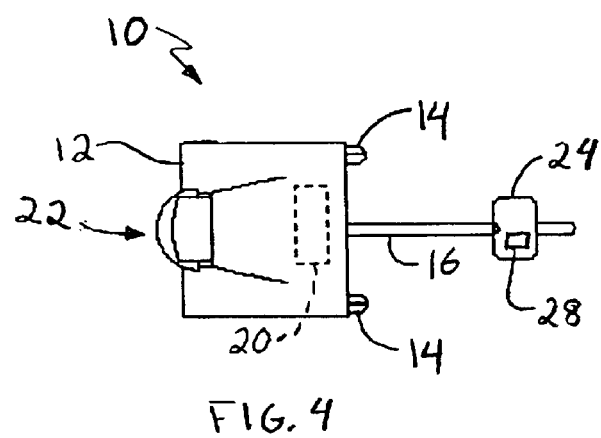
FIG. 4 is a top view of the spatial data collection apparatus shown in FIG. 1.

A spatial data collection apparatus 10, as shown in FIGS. 1–4, collects and correlates spatial data for use in creating floor plans, maps, models, or other two-dimensional (2-D) or three-dimensional (3-D) graphical representations of existing spaces. When moved around a space having objects or surfaces (e.g., a room with walls and ceilings), the spatial data collection apparatus 10 collects positional data related to a position of the spatial data collection apparatus 10 and range data related to distances and angles between the spatial data collection apparatus 10 and the objects in the space. The spatial data collection apparatus 10 correlates the positional data and the range data to produce spatial data used to create the graphical representation of the existing space. The spatial data collection apparatus 10 can also record and positionally embed other information (e.g., audio or video) or sensor data (e.g., temperature or radiation) relating to locations throughout the space.

The spatial data collection apparatus 10 includes a mobile platform 12 and at least one wheel 14 attached to the platform 12, for example, using hubs. A handle 16 or other structure is attached to the platform 12 for moving and directing the mobile platform 12. The spatial data collection apparatus 10 also includes one or more positional sensors 20 (shown schematically), such as shaft encoders and/or an inertial measurement unit (IMU), for generating the positional data. The apparatus 10 further includes one or more range-finding devices 22 located on the platform 12 for measuring and calculating the range data. The collection and correlation of the positional data and range data to produce the spatial data is described in greater detail below. The spatial data collection apparatus 10 also includes user controls or interface 24, which can be hand held or snapped into place on the handle 16.

The preferred embodiment of the spatial data collection apparatus 10 is designed to permit movement of the apparatus 10 in a way that will minimize errors in the positional data and the range data. The preferred embodiment includes wheels 14 that are preferably sized and located to allow the platform 12 to rotate in place. The wheels 14 are also large enough to allow the platform 12 to traverse or surmount common obstacles, such as sills, low steps, carpet edges and cords, without having to lift the apparatus 10 and while maintaining the platform 12 substantially level. The preferred embodiment of the apparatus 10 also includes casters 26 or another type of wheel or structure to keep the mobile platform 12 and the range-finding device(s) 22 level as the platform 12 moves. One preferred embodiment of the handle 16 has a catch (not shown) that limits the range of motion so that operators are discouraged from tilting the platform 12 when turning. The catch can also be unlatched in order to move the handle 16 into a position convenient for storage or transportation.

One preferred embodiment of the spatial data collection apparatus 10 further includes one or more recording devices 28, for example, integrated in the user interface 24. The recording device(s) 28 can be used to record additional information such as audio, video, and/or images as the apparatus 10 is moved around. The spatial data collection apparatus 10 can also include additional sensors (not shown) for recording other types of data (e.g., thermal, gas, radiation, biohazard, moisture, or motion) or other types of input devices for recording information such as text.

Figure 5:
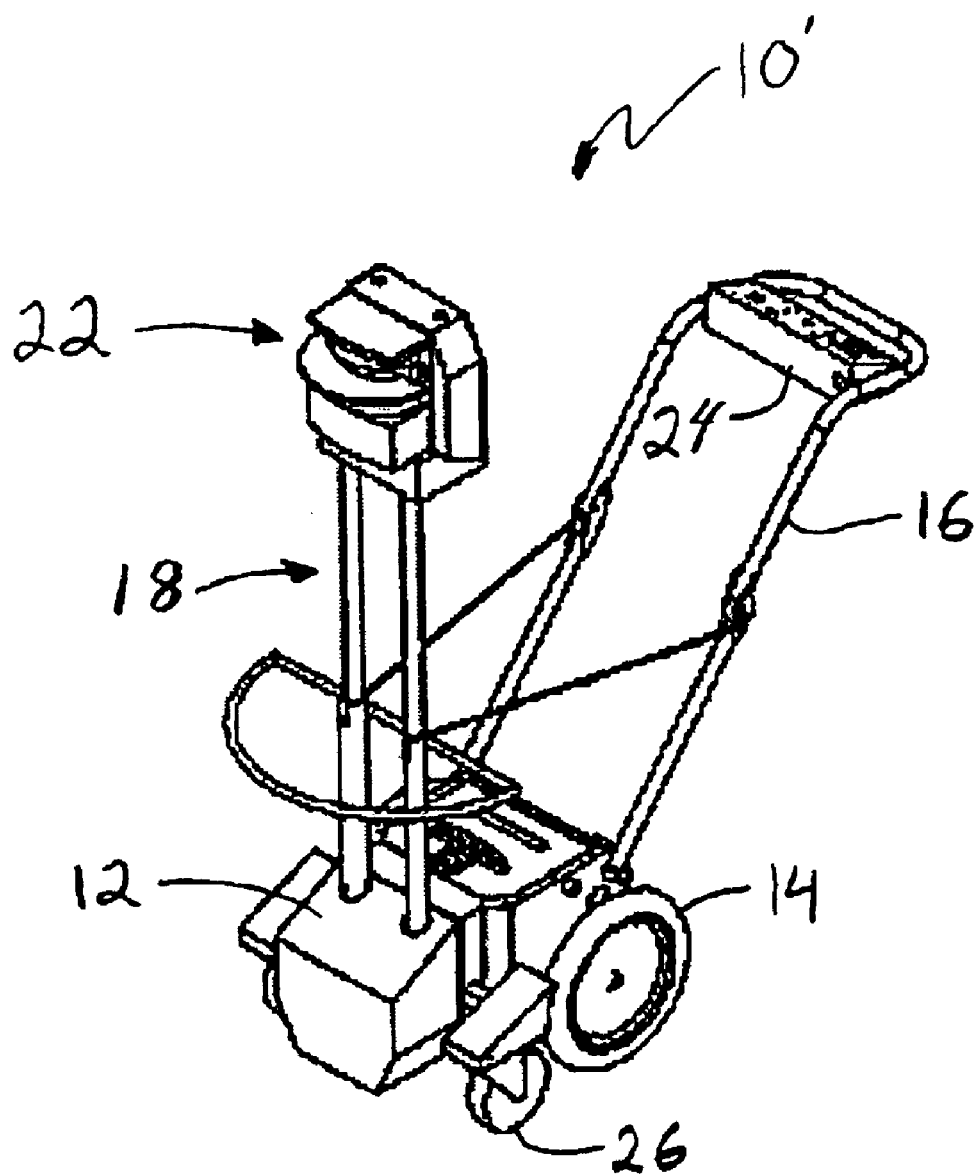
FIG. 5 is a perspective view of a spatial data collection apparatus, according to another embodiment of the present invention.

Another embodiment of the spatial data collection apparatus 10', shown in FIG. 5, includes a height adjustment mechanism 18 for adjusting the height of the range-finding device 22. The range-finding device 22 in this embodiment is capable of measuring at the architectural standard height of 4 ft. Although the exemplary embodiments show a specific design and configuration for the spatial data collection apparatus 10, other designs and configurations are also contemplated within the scope of the present invention.

Figure 6:
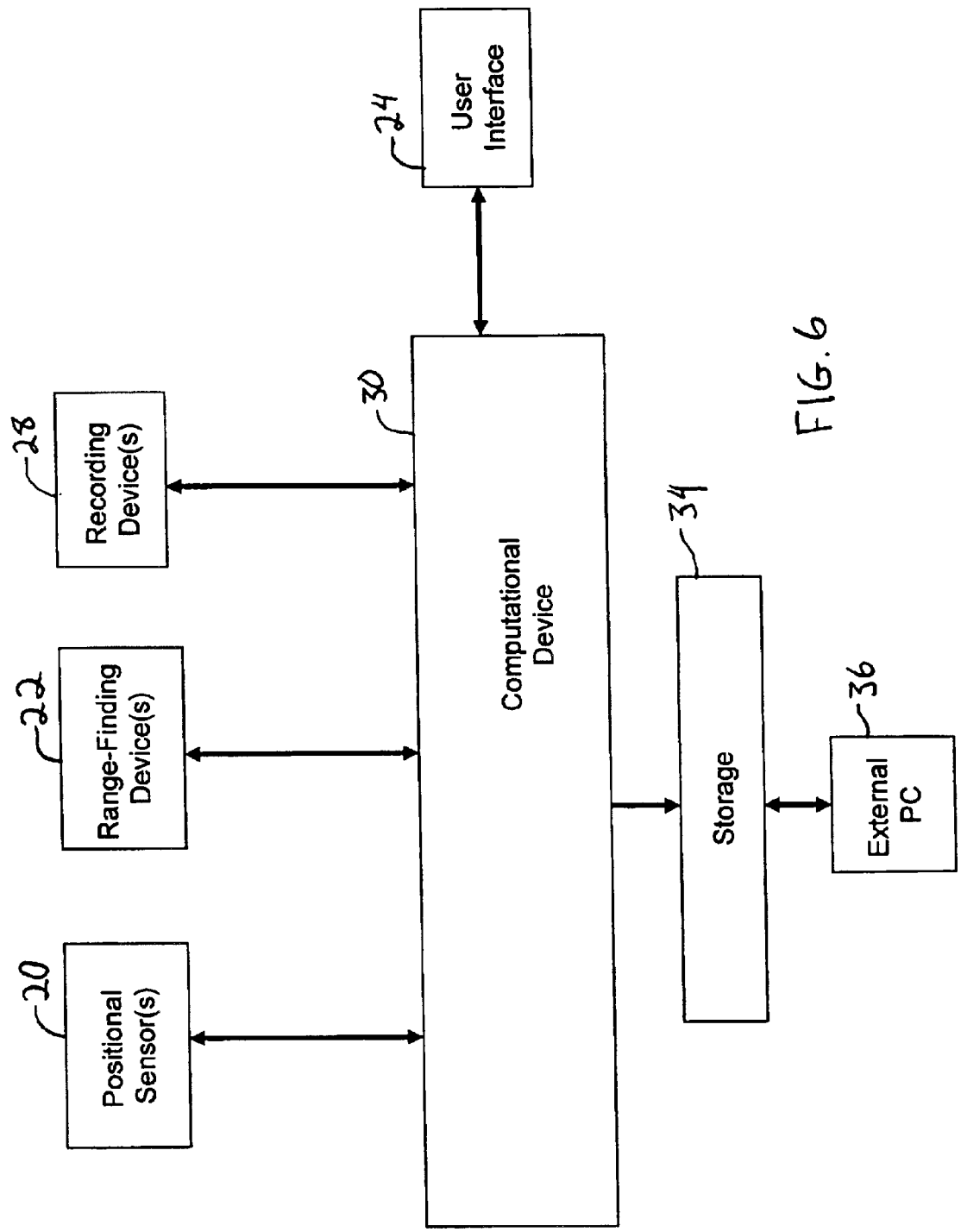
FIG. 6 is a schematic block diagram of the spatial data collection apparatus, according to one embodiment of the present invention.

The spatial data collection apparatus 10 includes a computational device 30, such as an onboard personal computer (PC), connected to the positional sensor(s) 20, the range-finding device(s) 22, and the optional recording device(s) 28, as shown schematically in FIG. 6. The computational device 30 collects the positional data and the range data and correlates the range data to the positional data representing the locations of the apparatus 10 when the range-data was obtained. The correlated range data and positional data is referred to collectively as spatial data. Any information recorded by the recording device(s) 28 is positionally embedded with the spatial data according to the locations of the apparatus 10 at the time the information was recorded. A storage device or system 34 stores the range-data along with the positional data representing the locations of the apparatus 10 when the range-data was obtained (i.e., the spatial data). The storage system 34 also stores any positionally embedded recorded information. The data can also be transferred to an external PC 36, for example, to be used in creating the 2-D or 3-D graphical representations of the space.

Figure 7:
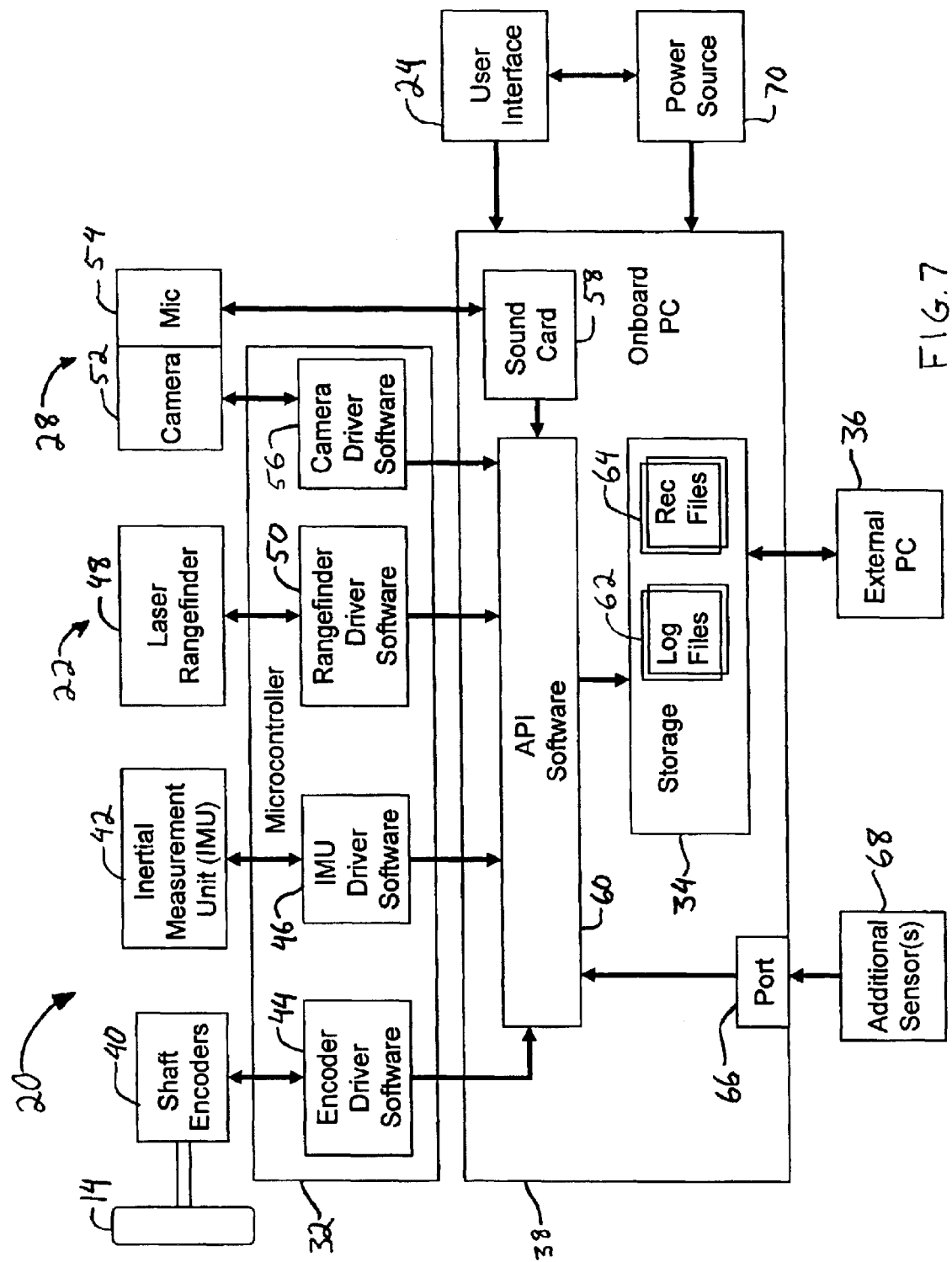
FIG. 7 is a schematic block diagram of the spatial data collection apparatus, according to a more specific embodiment of the present invention.

A schematic diagram of one embodiment of the spatial data collection apparatus 10 is shown in greater detail in FIG. 7. This exemplary embodiment operates in a client-server environment with a microcontroller 32 and an onboard PC 38. The microcontroller 32 generally includes software for collecting the data and the onboard PC 38 includes software for fusing and correlating the data. Other implementations of the spatial data collection apparatus 10 are also contemplated.

In the exemplary embodiment, the positional sensors 20 include both shaft encoders 40 for generating odometry data and an inertial measurement unit (IMU) 42 for generating IMU data used to correct the odometry data. Alternatively, the shaft encoders 40 can be used without the IMU 42, or vice versa, to generate the positional data.

The shaft encoders 40 are attached to each wheel 14 to record the odometry data, i.e., changes in the position of each wheel 14 relative to the hub or other attachment to the apparatus 10. One example of the shaft encoder 40 is a 2048-tick encoder such as the type that is known to those of ordinary skill in the art. Encoder driver software 44 on the microcontroller 32 transfers the odometry data from the encoders 40 to the onboard PC 38. In one embodiment, the encoder driver software 44 collects and converts raw odometry data into (x, y, θ) coordinate systems and transfers the converted data to the onboard PC 30. One example of the encoder driver software 44 is incorporated in the controller software, such as the ActivMedia Robotics Operating System (AROS), on the microcontroller server 32.

The IMU 42 is located on the apparatus 10 to measure radial and/or translational motion of the apparatus 10. The IMU 42 can be a rate gyroscope, a magnetometer and/or an accelerometer. The IMU 42 is preferably used to correct for errors in the odometry data (e.g., caused by slippage or other errors in encoder information). The error is calculated by comparing the odometry data generated by the encoder 40 with the motion of the apparatus 10 as perceived by the IMU 42 and correcting the odometry data to match the statistically most probable position based on the IMU data. One example of the IMU 42 is the inertial sensor available from InterSense, Inc. under the name InertiaCube$^2$. IMU driver software 46 on the microcontroller 32 collects and transfers the raw IMU data to the onboard PC 38.

The range-finding device 22 preferably includes a laser rangefinder 48 capable of measuring range data (i.e., distances and angles with respect to the apparatus 10) from many points in the space nearly simultaneously (e.g., 180 or more range data points in a single scan). One example of the laser rangefinder 48 is the type available from SICK AG under the name SICK LMS200. Rangefinder driver software 50 on the microcontroller 32 collects and transfers the raw range data to the onboard PC 38. The spatial data collection apparatus 10 can also include another range-finding device for collecting 3-D range data.

In an alternative embodiment, the spatial data collection apparatus 10 the positional sensor(s) 20 together with a distance-measuring device, such as a Leica Distometer available from Leica Geosystems, held in place by a pan-tilt mount with angular position sensing. The distance measuring device is aimed at each corner of the room, doorway, window, and vertices of other objects and the range data is measured with respect to the vertices. The form of the room and position, size and shape of each doorway, window, and other object is calculated based on the vertices rather than the edges and/or surfaces of the shape.

In the exemplary embodiment, the recording device 28 includes a camera 52 and a microphone 54. Hardware and/or software on the microcontroller 32 and/or onboard PC 38 is used to feed the recorded information from the camera 52 and the microphone 54 to the onboard PC 38. In the exemplary embodiment, a camera driver 56 on the microcontroller 32 feeds the recorded video or images to the onboard PC and a sound card 58 on the onboard PC 38 digitizes and feeds the recorded audio.

The onboard PC 38 includes application program interface (API) software 60 for collecting and correlating the positional data and the range data. One example of the API software is the ActivMedia Robotics Interface for Applications (ARIA) software available from ActivMedia Robotics, LLC. Other types of software can also be used to perform the functions described in greater detail below.

The API software 60 collects and time-stamps the odometry data received from the shaft encoders 40 and/or the IMU data received from the IMU 42. The API software 60 (e.g., the ARIA laser plug-in software) preferably uses a Kahiman filter to fuse the odometry data and the IMU data and to correct for any discrepancies in the odometry data based on the IMU data. The API software 60 then interpolates from the fused positional data where the apparatus was when the range data was measured. The API software 60 records the spatial data, i.e., the range data along with the positional data representing the locations of the apparatus when the range data was measured.

The spatial data is preferably recorded and stored in log files 62 on the storage system 34. The recorded information is stored in recorded files 64. In one example, individual log files 62 include the date, time, and an indexed name such as "012202_000001.log." Any associated recorded information, such as audio, video, or other sensor files, is preferably indexed to the spatial data. For example, an audio file can have the same name as the associated log file and the x,y (z) coordinates where the recording was started (e.g., 012202_00001_122_3503.wav began recording at coordinates x=122, y=3503.)

The onboard PC 38 can also include additional ports 66 for connecting additional sensors 68, such as thermal, gas, moisture, motion or other sensing devices, to the spatial data collection apparatus 10. The onboard PC 38 also preferably includes a port or other type of connection to the external PC 36 for creating, viewing and editing a 2-D or 3-D graphical representation based on the logged data, as described in greater detail below. Alternatively, the storage system 34 can include a portable storage medium (e.g., a plug-in data storage module) that stores the log files 62 and recorded files 64. The portable storage medium can be connected or "plugged in" to the external PC 36 to download the files 62, 64. The capacity of the portable storage medium may be expanded according to need. Other data transfer techniques are also contemplated.

A power source 70, such as a hot-swappable, rechargeable battery, provides power to all of the electronics in the spatial data collection apparatus 10. The user interface 24 preferably includes electronics to control power to the onboard PC 38, to initiate data collection, and to handle any recording or sensing devices 28.

Figure 8:
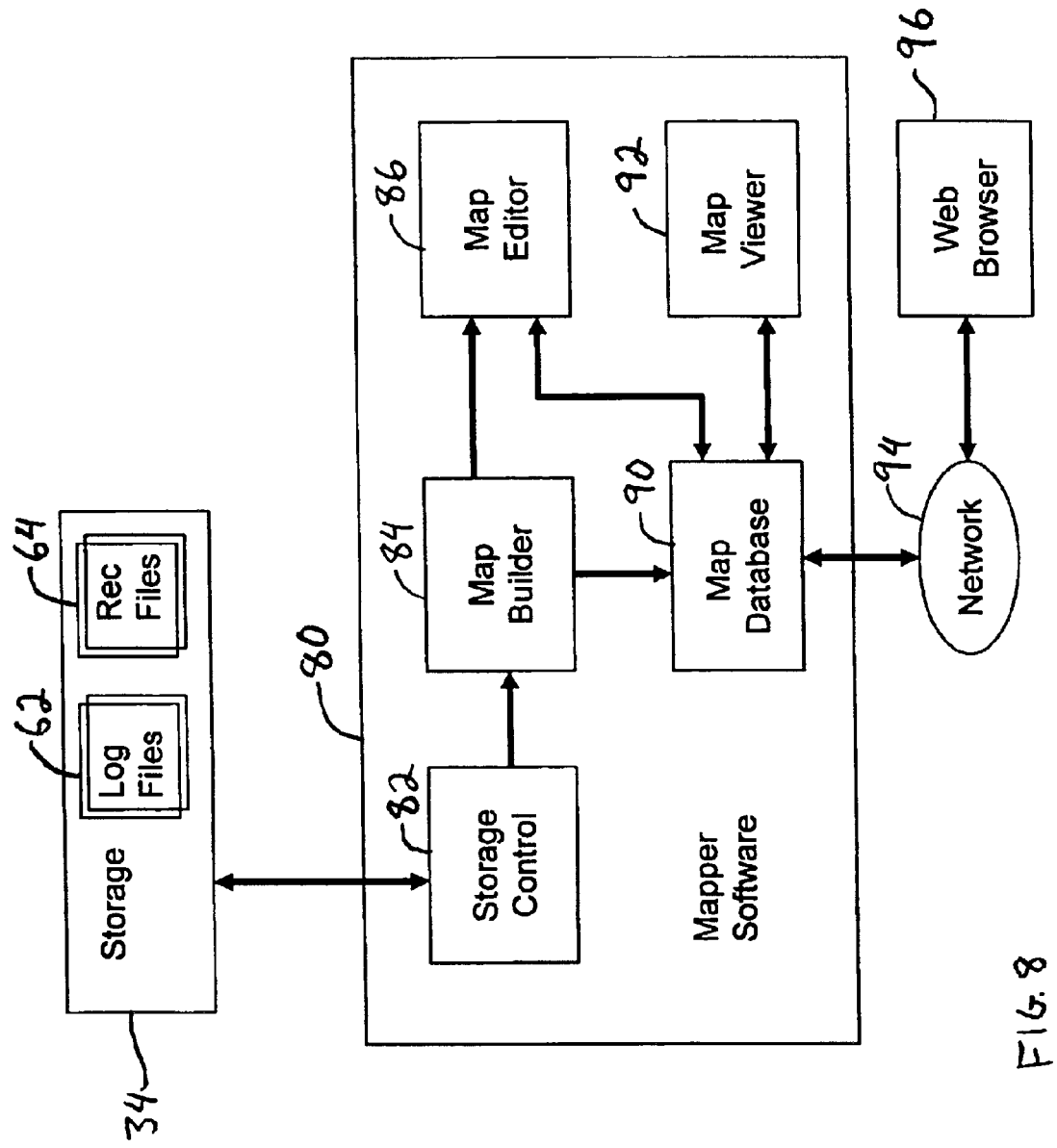
FIG. 8 is a schematic block diagram of the mapper software, according to one embodiment of the present invention.

In one preferred embodiment, the external PC 36 includes mapper software 80, FIG. 8, for transferring the data from the spatial data collection apparatus 10, creating the 2-D or 3-D graphical representation, and viewing and/or editing the graphical representation. The terms "map, mapper, and mapping" are used herein to refer to any type of 2-D or 3-D graphical representation of an existing space. The mapper software 80 includes storage control 82 that accesses the storage system 34 to transfer the stored data including the spatial data log files 62, the recorded files 64 (e.g., audio files), and any other sensor data from the storage system. The storage control software 82 also has the capability of erasing the files 62, 64 from the storage system 34, if necessary.

The mapper software 80 also includes a map builder 84 that converts the log files 62 into the 2-D or 3-D graphical representation and creates the representation of the spatial data with positionally embedded, retrievable recorded files 64 (e.g., audio, video, and/or still camera files) or other sensor data files. Thus, audio, video, sensor or other data files that are related by means of naming convention, reference table or other means to a specific position in the map can be displayed and retrieved from that position in the map. The preferred embodiment of the map builder 84 is capable of creating different types of map outputs in different formats such as vector formats (e.g., .dwg, .dlg, etc.) and grid formats (e.g., .bmp, etc.). Maps created in vector formats are saved together with separate, but indexed, recorded files. For maps created in grid formats, the recorded files are indexed directly in the map so that users may click on the corresponding location in the map (e.g., as indicated by an icon) to listen to or view the recording. The map builder 84 can include a toggle switch for setting the parameters for conversion to a selected format. Other parameter settings can also be set in the map builder 84 to vary map characteristics, such as threshold for determining grid occupancy.

One example of the map builder 84 includes software such as the type available under the name Scan Studio for performing the conversion of the log files and creating the 2-D or 3-D representations. Examples of these mapping algorithms, which are known to those of ordinary skill in the art, are described in greater detail by S. Guttman and K. Konolige in the paper *Incremental Mapping of Large Cyclic*

*Environments*, In Proceedings of the IEEE International Symposium on Computational Intelligence in Robotics and Automation (CIRA), 2000, and by Sebastian Thrun in the paper *A Probabilistic Online Mapping Algorithm for Teams of Mobile Robots*, International Journal of Robotics Research, 20(5):335–363, 2001, both of which are incorporated herein by reference. One example of three-dimensional map building algorithms, which are known to those of ordinary skill in the art, are described by Yufeng Liu, Rosemary Emery, Deepayan Chakrabarti, Wolfram Burgard and Sebastian Thrun in *Using EM to Learn 3D Models with Mobile Robots* (published online at http://www-2.cs.cmu.edu/~thrun/papers/thrun.3D-EM.html), which is fully incorporated herein by reference.

Mapper software 80 may also include a map editor 86 for converting maps into formats, such as .dxf and .jpg, for import into CAD software. The mapper software 80 may also enable editing the raster map created by the map builder 84 and adding additional information to be associated with the map. Map files and any associated information can be stored as map records in a map database 90. In the exemplary embodiment, grid maps may be accessible in a general purpose electronic database supplied with the mapper software 80. Maps created in grid formats may be edited in a number of different ways. Titles, labels, or other descriptive fields may be associated with the map or with specific locations on the map. Examples of map location information that can be entered and/or edited include location city/state, location street address, location name, location description, and other notations. Multiple map files can also be associated with each other, such as floors within the same building, by choosing a common field descriptor, such as the address of the building.

The grid map is capable of being edited, for example, by adding or deleting points on the map grid and by adding lines to the map grid. The entire map may also be rotated and/or rectilinearly aligned. Recorded files associated with the map are capable of being moved, deleted, inserted or edited in the map. The map editor 86 may further include tools for measuring a distance between two points (e.g., horizontal, vertical, and free-form) on the map and has the option to permanently display the measured distance on the map. Map files may also be embedded or registered with GIS/GPS information to provide additional information and the ability to zoom from exterior to interior spaces.

The mapper software 80 further includes a map viewer 92 that allows maps to be sorted, selected and displayed by various fields and at various scales. From the database 90, users can access a map record by any field and view the map, recorded files, and other information fields associated with that map record. The map viewer 92 allows the user to step back and forward through all of the map records associated with the same field (e.g., a particular town, address, or name). Positionally embedded recorded files may be played back either automatically or upon user demand, for example, by clicking on an icon in a displayed map. The map viewer 92 also allows a map record to be printed, for example, to a printer, plotter, .pdf file, or in another format suitable for loading into display software such as PowerPoint. The map viewer 92 also preferably allows the conversion into another map format, for example, from a grid format to a vector format file (e.g., .dxf, .dwg).

In another embodiment, the map records, including the map files, information fields, and other embedded files, can be made available over a network 94 and can be viewed from a remote location, for example, using a Web browser 96. The maps can be made available for various purposes including emergency planning, security, review, inspection, specification, verification, promotion and entertainment.

Figure 9:
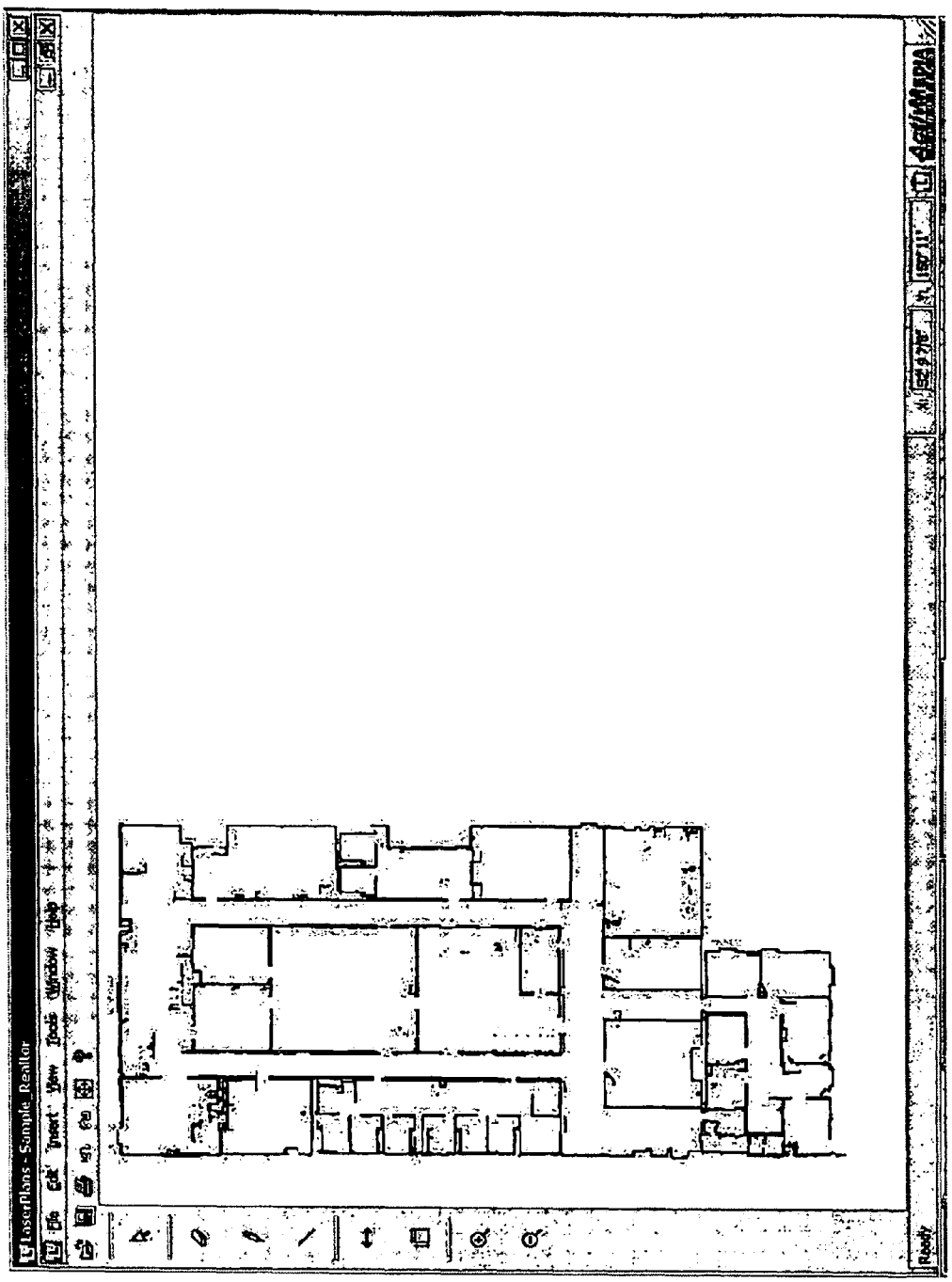
FIG. 9 is a screen shot of a floor plan created and displayed by the mapper software used with the spatial data

According to one method of use, the operator pushes and/or pulls the spatial data collection apparatus 10 around a building along corridors, into and around rooms or other spaces. As the apparatus is moved, it collects the range data and positional data (e.g., the odometry data and inertial data). Along the way, the operator may record audio commentary, video and/or sensor information for later retrieval for purposes of location notes, building inspection issues, security concerns, home improvement notes, promotional or tour narration, and the like. The operator may map a number of locations before processing the maps, floor plans or models. The apparatus 10 may be capable of storing hundreds of maps, depending upon the size and amount of commentary or other data. The maps, floor plans, or models can be used in construction, remodeling, repair, inspection, modeling, rescue, servicing, promotion, and viewing of and within buildings and other spaces. One example of a floor plan created using the spatial data collection apparatus is shown in FIG. 9.

Accordingly, the spatial data collection apparatus collects distance information from many points nearly simultaneously, thus improving the speed of spatial data collection. The spatial data collection apparatus automatically orients and establishes relationships between multiple spaces or multiple objects within a space. The spatial data collection apparatus also does not require a remote unit and is less complex and easier to use than a mobile robot. The preferred embodiment of the spatial data collection apparatus is also capable of recording and positionally embedding additional information. The spatial data collection apparatus is further capable of presenting the spatial data and any embedded recordings or information in an accessible and useful format.

While the principles of the invention have been described herein, it is to be understood by those skilled in the art that this description is made only by way of example and not as a limitation as to the scope of the invention. Modifications and substitutions by one of ordinary skill in the art are considered to be within the scope of the present invention, which is not to be limited except by the following claims.

The invention claimed is:

1. A spatial data collection apparatus comprising:
   a mobile platform;
   at least one wheel coupled to said mobile platform;
   at least one positional sensor located on said mobile platform for generating positional data related to a position of said mobile platform;
   at least one range-finding device located on said mobile platform for measuring and calculating range data relating to distances and angles between said mobile platform and objects;
   a computational device for collecting and correlating said positional data and said range data to produce spatial data, said computational device comprising:
      software drivers for transferring said positional data and said range data to said computational device; and
      software for collecting and time stamping said positional data and said range data and for interpolating positions of said mobile platform when said range data was taken to produce said spatial data and for storing said spatial data by logging said range data with said positional data representing said positions when said range data was taken; and a storage system connected to said computational device for storing said spatial data.

2. A spatial data collection apparatus comprising:

a mobile platform;

at least one wheel coupled to said mobile platform;

at least one positional sensor located on said mobile platform for generating positional data related to a position of said mobile platform, said positional sensor further comprising at least one shaft encoder on said at least one wheel for generating odometry data;

at least one range-finding device located on said mobile platform for measuring and calculating range data relating to distances and angles between said mobile platform and objects;

a computational device for collecting and correlating said positional data and said range data to produce spatial data;

software for collecting raw encoder data, converting said raw encoder data into an x, y, θ coordinate system, and for transferring said converted encoder data to said computational device; and a storage system connected to said computational device for storing said spatial data.

3. A spatial data collection apparatus comprising:

a mobile platform;

at least one wheel coupled to said mobile platform;

at least one positional sensor located on said mobile platform for generating positional data related to a position of said mobile platform, said positional sensor further comprising an inertial measurement unit (IMU) for measuring radial motion of said mobile platform and generating IMU data used to correct said odometry data;

at least one range-finding device located on said mobile platform for measuring and calculating range data relating to distances and angles between said mobile platform and objects;

a computational device for collecting and correlating said positional data and said range data to produce spatial data;

software for collecting raw encoder data, converting said raw encoder data into an x, y, θ coordinate system, and for transferring said converted encoder data to said computational device; and a storage system connected to said computational device for storing said spatial data.

4. The spatial data collection apparatus of claim 3 wherein said computational device includes software for correcting discrepancies between said odometry data and said IMU data.

5. The spatial data collection apparatus of claim 4 wherein said computational device includes software for fusing said IMU data with said odometry data, for interpolating from said fused positional data positions of said mobile platform when said range data was taken to produce said spatial data, and for storing said spatial data by logging said range data with said fused positional data representing said positions when said range data was taken.

* * * * *